(12) United States Patent
Peng et al.

(10) Patent No.: US 12,132,569 B2
(45) Date of Patent: Oct. 29, 2024

(54) METHOD FOR SIDELINK RATE MATCHING AND RESOURCE MAPPING, AND DEVICE

(71) Applicant: VIVO MOBILE COMMUNICATION CO., LTD., Chang'an Dongguan (CN)

(72) Inventors: Shuyan Peng, Chang'an Dongguan (CN); Huaming Wu, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 331 days.

(21) Appl. No.: 17/579,211

(22) Filed: Jan. 19, 2022

(65) Prior Publication Data

US 2022/0149987 A1 May 12, 2022

Related U.S. Application Data

(63) Continuation of application No. PCT/CN2020/103117, filed on Jul. 20, 2020.

(30) Foreign Application Priority Data

Jul. 29, 2019 (CN) .......................... 201910691374.5

(51) Int. Cl.
*H04L 1/00* (2006.01)
*H04W 72/20* (2023.01)
(52) U.S. Cl.
CPC ........... *H04L 1/0067* (2013.01); *H04W 72/20* (2023.01)

(58) Field of Classification Search
None
See application file for complete search history.

(56) References Cited

U.S. PATENT DOCUMENTS

2014/0092830 A1\* 4/2014 Chen ..................... H04L 5/0053
370/329
2018/0035430 A1 2/2018 Futaki
(Continued)

FOREIGN PATENT DOCUMENTS

CN 108540985 A 9/2018
CN 109151893 A 1/2019
(Continued)

OTHER PUBLICATIONS

First Chinese Office Action related to Application No. 201910691374.5 reported on Mar. 29, 2021.
(Continued)

*Primary Examiner* — The Hy Nguyen
(74) *Attorney, Agent, or Firm* — von Briesen & Roper, s.c.

(57) ABSTRACT

Embodiments of this disclosure disclose a method for sidelink rate matching and resource mapping and a device, so as to provide a solution to rate matching and resource mapping for sidelink communication. The method is executed by a terminal device and includes: calculating, based on a resource size of a target resource, a length E of coded bits carriable by a usable resource with the target resource excluded; and performing resource mapping based on a coded bit sequence output by rate matching, where a length of the coded bit sequence is equal to E or equal to E+E', and E' is a length of coded bits carriable by the target resource.

15 Claims, 2 Drawing Sheets

100

Calculate, based on a resource size of a target resource, a length E of coded bits carriable by a usable resource with the target resource excluded ~ S102

Perform resource mapping based on a coded bit sequence output by rate matching, where a length of the coded bit sequence is equal to E or equal to E+E', and E' is a length of coded bits carriable by the target resource ~ S104

(56) References Cited

U.S. PATENT DOCUMENTS

| | | | |
|---|---|---|---|
| 2019/0149309 A1 | 5/2019 | Kuang et al. | |
| 2019/0215817 A1 | 7/2019 | Chae et al. | |
| 2019/0289668 A1 | 9/2019 | He et al. | |
| 2019/0364585 A1 | 11/2019 | Lee et al. | |
| 2020/0119850 A1* | 4/2020 | Gao | H04L 5/0007 |
| 2020/0221424 A1 | 7/2020 | Sun | |
| 2020/0305154 A1* | 9/2020 | Wu | H04L 5/0044 |
| 2021/0143939 A1* | 5/2021 | Dong | H04L 5/0035 |
| 2022/0116850 A1* | 4/2022 | Ahn | H04W 88/04 |

FOREIGN PATENT DOCUMENTS

| | | | | |
|---|---|---|---|---|
| CN | 109391438 A | | 2/2019 | |
| CN | 109565490 A | | 4/2019 | |
| CN | 109691003 A | | 4/2019 | |
| CN | 110050433 A | | 7/2019 | |
| EP | 3499972 A1 | | 6/2019 | |
| EP | 3544358 A1 | | 9/2019 | |
| WO | WO-2017219284 A1 | * | 12/2017 | ......... H04L 27/0006 |
| WO | 2018182365 A1 | | 10/2018 | |
| WO | 2019004881 A1 | | 1/2019 | |

OTHER PUBLICATIONS

First Indian Office Action related to Application No. 202227006951 reported on Jun. 30, 2022.

R1-1716346—Source: Ericsson "On rate matching", Agenda Item: 6.2.1.7, Document for: Discussion and Decision, 3GPP TSG-RAN WG1 NR Ad Hoc #3, Nagoya, Japan, Sep. 18-21, 2017.

International Search Report and Written Opinion related to Application No. PCT/CN2020/103117 reported on Oct. 27, 2020.

Extended Search Report to Application No. 20847388.4; reported on Jul. 19, 2022.

Qualcomm Incorporated, "Considerations on Physical Layer aspects of NR V2X", Feb. 25-Mar. 1, 2019, 3GPP TSG RAN WG1 Meeting #96, Agenda item: 7.2.4.1.1, Athens, Greece, R1-1902994.

LG Electronics, "Discussion on physical layer structure for NR sidelink", May 13-17, 2019, 3GPP TSG RAN WG1 #97, Agenda Item: 7.2.4.1, Reno, USA, R1-1907012.

First Japanese Office Action related to Application No. 2022-506315; reported on Feb. 27, 2023.

R2-1811010—Source: Spreadtrum Communications "Discussion on sidelink physical layer structures and procedure(s)", Agenda Item: 7.2.4.1.2, Document for: Discussion and decision, 3GPP TSG RAN WG1 Meeting #94bis, Chengdu, China, Oct. 8-12, 2018.

R1-1900029—Source: Huawei, HiSilicon "QoS management for NR V2X", Agenda Item: 7.2.4.4, Document for: Discussion and decision, 3GPP TSG RAN WG1 Ad-Hoc Meeting 1901, Taipei, Jan. 21-25, 2019.

R2-1903945—Source: Huawei, HiSilicon "Sidelink reference signal design for NR V2X", Agenda Item: 7.2.4.8, Document for: Discussion and decision, 3GPP TSG RAN WG1 Meeting #96bis, Xi'an, China, Apr. 8-12, 2019.

* cited by examiner

METHOD FOR SIDELINK RATE MATCHING AND RESOURCE MAPPING, AND DEVICE

CROSS-REFERENCE TO RELATED APPLICATIONS

This application is a continuation application of International Application No. PCT/CN2020/103117 filed on Jul. 20, 2020, which claims priority to Chinese Patent Application No. 201910691374.5, filed on Jul. 29, 2019 and entitled "METHOD FOR SIDELINK RATE MATCHING AND RESOURCE MAPPING; AND DEVICE", which are incorporated herein by reference in their entireties.

TECHNICAL FIELD

Embodiments of this disclosure relate to the communications field, and in particular, to a method for a sidelink rate matching and resource mapping, and a device.

BACKGROUND

In Long Term Evolution (LTE), sidelink communication is performed in a broadcast form, and although being used for basic security communications such as vehicle to everything (V2X), is not applicable to more advanced V2X services. A new radio (NR) system supports more advanced sidelink transmission designs, such as unicast, broadcast, or multicast, so as to support more comprehensive service types.

In conventional technologies, if rate matching and resource mapping cannot be performed properly, a demodulation probability of sidelink data may be reduced, affecting communication efficiency of the system. At present, how to perform rate matching and resource mapping in sidelink communication in NR systems, is a technical problem that needs to be resolved urgently in related technologies.

SUMMARY

According to a first aspect, a method for sidelink rate matching and resource mapping is provided, where the method is executed by a terminal device, and the method includes:

calculating, based on a resource size of a target resource, a length E of coded bits carriable by a usable resource with the target resource excluded; and performing resource mapping based on a coded bit sequence output by rate matching, where a length of the coded bit sequence is equal to E or equal to E+E', and E' is a length of coded bits carriable by the target resource.

According to a second aspect, a terminal device is provided, where the terminal device includes:

a calculation module, configured to: based on a resource size of a target resource, calculate a length E of coded bits carriable by a usable resource with the target resource excluded; and a resource mapping module, configured to perform resource mapping based on a coded bit sequence output by rate matching, where a length of the coded bit sequence is equal to E or equal to E+E', and E' is a length of coded bits carriable by the target resource.

According to a third aspect, a terminal device is provided, where the terminal device includes a processor, a memory, and a computer program stored in the memory and capable of running on the processor, and when the computer program is executed by the processor, the steps of the method for sidelink rate matching and resource mapping according to the first aspect are implemented.

According to a fourth aspect, a computer-readable storage medium is provided, where a computer program is stored in the computer-readable storage medium, and when the computer program is executed by a processor, the steps of the method for sidelink rate matching and resource mapping according to the first aspect are implemented.

BRIEF DESCRIPTION OF DRAWINGS

The accompanying drawings described herein are intended for better understanding of this disclosure, and constitute a part of this disclosure. Exemplary embodiments and descriptions thereof in this disclosure are intended to interpret this disclosure and do not constitute any improper limitation on this disclosure. In the accompanying drawings.

DETAILED DESCRIPTION OF EMBODIMENTS

To make the objectives, technical solutions, and advantages of this disclosure clearer, the following clearly describes the technical solutions in the embodiments of this disclosure with reference to the accompanying drawings in the embodiments of this disclosure. Apparently, the described embodiments are a part rather than all of the embodiments of this disclosure. All other embodiments obtained by a person of ordinary skill in the art based on the embodiments of this disclosure shall fall within the protection scope of this disclosure. The term "and/or" in the embodiments of this specification represents presence of at least one of the connected objects.

It should be understood that the technical solutions of the embodiments of this disclosure can be applied to various communications systems, for example, an LTE sidelink system, an NR sidelink system, or a later evolved sidelink communications system.

In the embodiments of this disclosure, a terminal device may include but is not limited to a mobile station (MS), a mobile terminal, a mobile phone (Mobile Telephone), user equipment (UE), a handset, a portable equipment, a vehicle, and the like. The terminal device may communicate with one or more core networks by using a radio access network (RAN). For example, the terminal device may be a mobile phone (also referred to as a "cellular" phone), or a computer having a wireless communication function; or the terminal device may be a portable, pocket-sized, handheld, computer built-in, or in-vehicle mobile apparatus.

Figure 1:
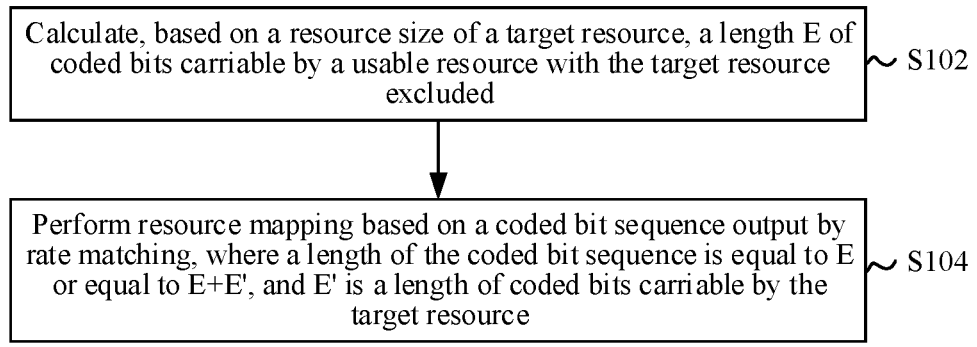
FIG. 1 is a schematic flowchart of a method for sidelink rate matching and resource mapping according to an embodiment of this disclosure.

As shown in FIG. 1, an embodiment of this disclosure provides a method 100 for sidelink rate matching and resource mapping. The method may be executed by a terminal device and includes the following steps.

Step S102: Calculate, based on a resource size of a target resource, a length E of coded bits carriable by a usable resource with the target resource excluded.

The target resource is part of the usable resource. Optionally, the target resource may include:

(1) a resource occupied by automatic gain control (AGC); or (2) a resource occupied by a physical sidelink shared channel (PSSCH), where the resource occupied by the PSSCH and a resource occupied by a physical sidelink control channel (PSCCH) overlap in time domain.

During sidelink communication, the 1st symbol or the first half symbol of the usable resource may be used for AGC adjustment. Therefore, the resource occupied by the AGC may be the 1st symbol or the first half symbol of the usable resource.

Optionally, a processing time/symbol length of the AGC is a predefined/preconfigured value.

Alternatively, the processing time/symbol length of the AGC is obtained based on a numerology.

Alternatively, a transmit-end terminal device indicates an AGC configuration to a receive-end terminal device by using sidelink control information SCI/sidelink radio resource control SL-RRC, for example, indicating information such as the processing time of the AGC/the symbol length of the AGC/whether the AGC is enabled.

Alternatively, the receive-end terminal device feeds back information to the transmit-end terminal device, indicating at least one of the following: whether AGC is enabled, the processing time of the AGC, the number of symbols of the AGC, and so on.

Figure 2:
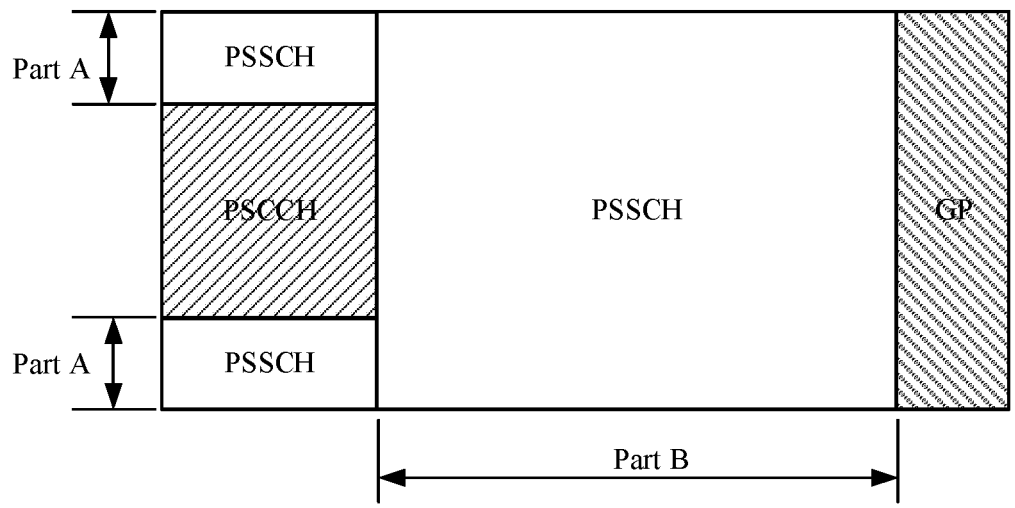
FIG. 2 is a schematic diagram of a target resource according to an embodiment of this disclosure.

In a case that the target resource is the PSSCH (overlapping the PSCCH in time domain), refer to FIG. 2 for details. In FIG. 2, the PSCCH occupies the first two symbols, and the target resource is the PSSCH in part A in FIG. 2, and a guard period (GP) occupies the last symbol.

For the usable resource in this embodiment, specifically, for example, in FIG. 2, the usable resource is the PSSCH resource in FIG. 2, including part A and part B in FIG. 2.

For calculation of E in this step, as shown in FIG. 2, a length E of coded bits carriable by the PSSCH of part B in FIG. 2 can be calculated. E may be calculated by the following formula:

$$E = N_{RE} \cdot Q_m \cdot v,$$

where $N_{RE}$ is the number of usable REs in a scheduled resource with the target resource excluded, specifically, for example, is the number of usable REs in part B in FIG. 2; $Q_m$ is a modulation order; and $v$ is the number of layers.

Optionally, in this step, a length E of coded bits carriable by the target resource can be calculated, and E may be calculated by the following formula:

$$E' = N_{RE\_A} \cdot Q_m \cdot v,$$

where $N_{RE\_A}$ is the number of usable REs in the target resource, specifically, for example, $N_{RE\_A}$ is the number of usable REs of the PSSCH in part A in FIG. 2; $Q_m$ is a modulation order; and $v$ is the number of layers.

Optionally, the same parameters such as $Q_m$ and $v$, other than the number of REs, are used for calculating E' and E.

Alternatively, E' is a value predefined by the protocol/(pre)configured by the network device, or is a value configured for downlink control information DCI/sidelink control information SCI/radio resource control RRC.

Alternatively, the number of usable REs used for calculating E' is related to configuration of a demodulation reference signal (DMRS)/channel state information-reference signal (CSI-RS)/phase-tracking reference signal (PTRS). For example, when the DMRS is not configured, the number of usable REs for each physical resource block PRB is 12; or if the DMRS is configured, the number of usable REs for each PRB is the number of REs on one symbol minus the number of REs of the DMRS.

The method 100 further includes S104: performing resource mapping based on a coded bit sequence output by rate matching, where a length of the coded bit sequence is equal to E or equal to E+E', and E' is a length of coded bits carriable by the target resource.

Rate matching may be performed before this step (a specific processing procedure is described in detail in subsequent embodiments). The length of the coded bit sequence output by rate matching is equal to E or equal to E+E'. For meanings of E and E', refer to the description in step S102.

Certainly, encoding processing may alternatively be performed before resource mapping. If polar coding is used, the encoding process is: information multiplexing→cyclic redundancy check (CRC) attachment→polar encoding→rate matching; or if LDPC coding is used, the encoding process is: CRC attachment→LDPC based graph selection→code block segmentation and code block CRC attachment→LDPC encoding→rate matching→code block concatenation.

In the method for sidelink rate matching and resource mapping provided in this embodiment of this disclosure, the terminal device may calculate, based on the resource size of the target resource, the length E of the coded bits carriable by the usable resource with the target resource excluded; and perform resource mapping based on the coded bit sequence output by rate matching, where the length of the coded bit sequence is equal to E or equal to E+E', and E' is the length of the coded bits carriable by the target resource. In this embodiment of this disclosure, the length E of the coded bits carriable by the usable resource with the target resource excluded is calculated, so as to provide a solution to rate matching and resource mapping for NR sidelink. In addition, the target resource in the usable resource is considered during the rate matching and resource mapping, thereby increasing a demodulation success rate of sidelink data and improving transmission efficiency of a system.

The following describes in detail the resource mapping process mentioned in S104 of the foregoing embodiment with reference to several implementation manners.

Manner 1:

S104 may include: mapping the coded bit sequence output by rate matching to the usable resource from the (N+1)-th symbol to the last symbol of the usable resource in ascending order, and then mapping a remaining coded bit sequence to the usable resource from the 1st symbol to the N-th symbol in ascending order.

The length of the coded bit sequence output by rate matching is equal to E+E', N is related to a transport block size, and the transport block size is related to the usable resource. Specifically, for example, when the target resource is AGC overheads, N=1.

Optionally, in the usable resource in manner 1, mapping information of the first N symbols is repetition of mapping information of the (N+1)-th to (2N)-th symbols, specifically, may be repetition of information in the rate matching process. In this way, when the target resource is the AGC overheads, the first N symbols may be used for AGC adjustment, with no need to demodulate the first N symbols, thereby increasing a demodulation success rate and improving communication efficiency.

Regarding the increasing the demodulation success rate and improving communication efficiency in the embodiments of this specification, the first N symbols are repeated information, even if the first N symbols are not demodulated, all valid information of a transmission time interval TTI is transmitted in symbols after the first N symbols, with no loss of information.

Certainly, if the first N symbols are not used for AGC adjustment, the demodulation success rate can be improved due to presence of such part of repeated information.

The foregoing operations are all described from the perspective of the receive-end terminal device. Certainly, the terminal device may selectively perform such operations, depending on whether the first N symbols are used for AGC adjustment.

Manner 2:

S104 may include: mapping the coded bit sequence output by rate matching to the usable resource from the (M+1)-th resource element RE to the last RE of the usable resource in ascending order, and then mapping a remaining coded bit sequence to the usable resource from the 1st RE to the M-th RE in ascending order.

The length of the coded bit sequence output by rate matching is equal to E+E', the target resource includes a resource occupied by the PSSCH, and M is the number of REs occupied by the PSSCH. The PSSCH herein is an overlapping part between the PSSCH and the PSCCH in time domain. For example, the PSSCH herein is the PSSCH of part A in FIG. 2.

Optionally, in the usable resource in manner 2, mapping information of the first M REs is repetition of mapping information of the (M+1)-th to (2M)-th REs, specifically, may be repetition of information in the rate matching process.

In manner 2, resource mapping is performed from the (M+1)-th RE. As shown in FIG. 2, if the PSCCH occupies two symbols, the number of REs occupied by the PSSCH in part A is M. In this case, mapping information of the REs occupied by the PSSCH in part A is repetition of mapping information of the first M REs of the PSSCH in part B.

Considering that in practical application, for resource mapping on the PSSCH of part B, resource mapping is performed in a frequency-first manner starting from the 1st symbol of the PSSCH in part B. Therefore, in manner 2, resource mapping is performed from the (M+1)-th RE, instead of performing resource mapping from the (N+1)-th symbol as that in manner 1.

Manner 3:

S104 may include: mapping the coded bit sequence output by rate matching to the usable resource from the (N+1)-th symbol to the last symbol of the usable resource in ascending order, where in the usable resource, complex-value symbols mapped to the first N symbols are the same as complex-value symbols mapped to the (N+1)-th to (2N)-th symbols.

The length of the coded bit sequence output by rate matching is equal to E, N is related to a transport block size, and the transport block size is related to the usable resource. Specifically, for example, when the target resource is AGC overheads, N=1.

Manner 4:

S104 may include: mapping the coded bit sequence output by rate matching to the usable resource from the (M+1)-th RE to the last RE of the usable resource in ascending order, where in the usable resource, complex-value symbols mapped to the first M REs are the same as complex-value symbols mapped to the (M+1)-th to (2M)-th REs.

The length of the coded bit sequence output by rate matching is equal to E, the target resource includes a resource occupied by the PSSCH, and M is the number of REs occupied by the PSSCH. The PSSCH herein is an overlapping part between the PSSCH and the PSCCH in time domain. For example, the PSSCH herein is the PSSCH of part A in FIG. 2.

Manner 5:

S104 may include: mapping the coded bit sequence output by rate matching to the usable resource from the 1st symbol to the last symbol of the usable resource in ascending order.

The length of the coded bit sequence output by rate matching is equal to E+E', N is related to a transport block size, and the transport block size is related to the usable resource. Specifically, for example, when the target resource is AGC overheads, N=1.

Optionally, in the usable resource in manner 5, mapping information of the first N symbols is repetition of mapping information of the (N+1)-th to (2N)-th symbols, specifically, may be repetition of information in the rate matching process. Details about the implementation process will be described later.

Optionally, in the usable resource in manner 5, mapping information of the first M REs is repetition of mapping information of the (M+1)-th to (2M)-th REs, specifically, may be repetition of information in the rate matching process. Details about the implementation process will be described later.

Manner 6:

S104 may include: mapping the coded bit sequence output by rate matching to the usable resource from the 1st symbol to the last symbol of the usable resource in ascending order.

The number of usable resource elements REs on the 1st symbol is half the total number of REs on the 1st symbol, and the length of the coded bit sequence output by rate matching is equal to E.

Optionally, on the 1st symbol, starting from an odd-numbered/even-numbered RE, every other RE is one usable REsource, that is, on the 1st symbol, resource mapping is performed on every other RE in frequency domain.

In manner 6, the target resource may be AGC overheads, and the AGC occupies the first half symbol of the usable resource.

Optionally, in manner 1 and manner 2, the length of the coded bit sequence output by rate matching is equal to E+E'. In manner 1, the mapping information of the first N symbols is repetition of the mapping information of the (N+1)-th to (2N)-th symbols. In manner 2, the mapping information of the first M REs is repetition of the mapping information of the (M+1)-th to (2M)-th REs. In order to implement information repetition, before the performing resource mapping based on a coded bit sequence output by rate matching, the method further includes the following encoding processing process:

in a case of polar coding, outputting a subsequence with a second sequence length E' and a subsequence with a first sequence length E starting from a position of k=0 of coded bits in a circular buffer during rate matching, so as to generate a sequence with a length E'+E (which is an abbreviation of the coded bit sequence described above), where the subsequence with the length E' is after the subsequence of the length E; or in a case of polar coding, outputting a subsequence with a second sequence length E' and a subsequence with a first sequence length E starting from a position of k=A−E of coded bits in a circular buffer during rate matching, so as to generate a sequence with a length E'+E, where the subsequence with the length E' is after the subsequence of the length E; where A is a length of the circular buffer, A is obtained through calculation based on E, and k represents a starting output position of the coded bits.

Optionally, in the foregoing manner 1 and manner 2, in order to implement the information repetition, before the performing resource mapping based on a coded bit sequence output by rate matching, the method further includes the following encoding processing process:

in a case of LDPC coding, outputting a subsequence with a second sequence length E' and a subsequence with a first sequence length E starting from a starting information position of a redundancy version in a circular buffer during rate matching, so as to generate a sequence with a length E'+E, where the subsequence with the length E' is after the subsequence of the length E.

Optionally, in the foregoing manner 1 and manner 2, before the performing resource mapping based on a coded bit sequence output by rate matching, the method further includes the following encoding processing process:

in a case of polar coding, outputting a subsequence with a first sequence length E starting from a position of k=A−E of coded bits in a circular buffer during rate matching, and outputting a subsequence with a second sequence length E' starting from a position of k=0 of the coded bits, so as to generate a sequence with a length E'+E, where the subsequence with the length E' is after the subsequence of the length E; or in a case of polar coding, outputting a subsequence with a first sequence length E starting from a position of k=0 of coded bits in a circular buffer during rate matching, and outputting a subsequence with a second sequence length E' starting from a position of k=E of the coded bits, so as to generate a sequence with a length E'+E, where the subsequence with the length E' is after the subsequence of the length E; or in a case of polar coding, outputting a subsequence with a first sequence length E starting from a position of k=E mod A of coded bits in a circular buffer during rate matching, and outputting a subsequence with a second sequence length E' starting from a position of k=(E mod A)+E of the coded bits, so as to generate a sequence with a length E'+E, where the subsequence with the length E' is after the subsequence of the length E.

A is a length of the circular buffer, A is obtained through calculation based on E, k represents a starting output position of the coded bits, and mod represents a modulo operation.

Optionally, in the foregoing manner 1 and manner 2, in order to implement the information repetition, before the performing resource mapping based on a coded bit sequence output by rate matching, the method further includes the following encoding processing process:

in a case of LDPC coding, outputting a subsequence with a second sequence length E' and a subsequence with a first sequence length E starting from a position of m=E of a redundancy version in a circular buffer during rate matching, so as to generate a sequence with a length E'+E, where the subsequence with the length E' is after the subsequence of the length E; or in a case of LDPC coding, outputting a subsequence with a second sequence length E' and a subsequence with a first sequence length E starting from a position of m=E mod A of a redundancy version in a circular buffer during rate matching, so as to generate a sequence with a length E'+E, where the subsequence with the length E is after the subsequence of the length E.

A is a length of the circular buffer, A is obtained through calculation based on E, m represents a starting output position, and mod represents a modulo operation.

Optionally, in manner 5, before the performing resource mapping based on a coded bit sequence output by rate matching, in order to implement repetition of the information in the rate matching process, the method further includes the following steps:

in a case of polar coding, outputting a subsequence with a second sequence length E' and a subsequence with a first sequence length E starting from a position of k=0 of coded bits in a circular buffer during rate matching, so as to generate a sequence with a length E'+E, where the subsequence with the length E' is before the subsequence of the length E; or in a case of polar coding, outputting a subsequence with a second sequence length E' and a subsequence with a first sequence length E starting from a position of k=A−E of coded bits in a circular buffer during rate matching, so as to generate a sequence with a length E'+E, where the subsequence with the length E' is before the subsequence of the length E.

A is a length of the circular buffer, A is obtained through calculation based on E, and k represents a starting output position of the coded bits.

Optionally, in manner 5, before the performing resource mapping based on a coded bit sequence output by rate matching, in order to implement repetition of the information in the rate matching process, the method further includes the following steps:

in a case of LDPC coding, outputting a subsequence with a second sequence length E' and a subsequence with a first sequence length E starting from a starting information position of a redundancy version in a circular buffer during rate matching, so as to generate a sequence with a length E'+E, where the subsequence with the length E' is before the subsequence of the length E.

In the foregoing manner 1 to manner 6, optionally, before the performing resource mapping based on a coded bit sequence output by rate matching, the following step may be further included: based on a configuration of numerology, determining a starting symbol position or starting RE position for the resource mapping, that is, selecting one of manner 1 to manner 6 based on the configuration of numerology.

For example, if the numerology SCS is 15 kHz, considering that the AGC may occupy the first half of the usable resource, manner 6 may be used; otherwise, when the SCS is not 15 kHz, other manners such as manner 1 and manner 2 may be used.

In the foregoing manner 1 to manner 6, optionally, before the performing resource mapping based on a coded bit sequence output by rate matching, the following step may be further included: based on a different RV value, determining a starting symbol position or starting RE position for the resource mapping, that is, selecting one manner based on the different RV value.

For example, for RV0/RV1, manner 1 and manner 2 may be used, and the mapping information is sequentially obtained from a starting position of RV0/RV1 in the circular buffer.

For example, for RV3/RV2, manner 5 may be used, and the mapping information is sequentially obtained from a starting position of RV3/RV2 in the circular buffer.

Further, different repetition processing may be performed for different redundancy versions based on whether the limited buffer rate matching LBRM is enabled. For example:

if LBRM is enabled, mapping is sequentially performed from the 2nd symbol to the last usable symbol of RV0, RV1, or RV2 (that is, in a case of N=1 in manner 1); and mapping is sequentially performed from the 1st symbol of RV3 (manner 5); or if LBRM is not enabled, mapping is sequentially performed from the 1st symbol to the last usable symbol of RV0 or RV1 (that is, manner 5); and mapping is sequentially performed from the 2nd symbol of RV2 or RV3 (that is, in a case of N=1 in manner 1).

In order to describe in detail the method for rate matching and resource mapping provided in the foregoing embodiment of this disclosure, the following provides description with reference to several specific embodiments.

Embodiment 1

(Embodiment 1 is divided into three sub-embodiments for description.)

Sub-Embodiment 1

The terminal device has a PSCCH that needs to be transmitted, and performs rate matching and resource mapping according to the following steps.

1. In a case of 1-symbol AGC (the target resource), the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E as the sequence length after rate matching.

5. Perform bit selection for SCI based on the rate matching process of DCI.

6. Perform possible scrambling and perform modulation to generate complex-valued symbols, where the generated complex-valued symbols are mapped to the usable resource from the 2nd symbol to the last symbol in ascending order according to a time-first/frequency-first principle. A complex-valued symbol mapped to the 1st symbol is the same as the complex-valued symbol mapped to the 2nd symbol.

In this embodiment, repetition processing is performed during resource mapping, that is, the complex-valued symbol mapped to the 1st symbol is the same as the complex-valued symbol mapped to the 2nd symbol. In this way, the 1st symbol for the receive-end terminal device may be used for AGC adjustment, and the 2nd symbol and subsequent symbols may be used for data demodulation, thereby increasing a demodulation success rate and improving communication efficiency. For specific effect achieving principles, refer to the foregoing description.

Sub-embodiment 2: The terminal device has a PSSCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E as the sequence length after rate matching.

5. Perform rate matching according to the PUSCH/PDSCH rate matching process, and output a sequence of the length E.

6. Perform possible scrambling on the sequence and perform modulation to generate complex-valued symbols, where the generated complex-valued symbols are mapped from the 2nd symbol to the last allocated symbol in ascending order according to a time-first/frequency-first principle. A complex-valued symbol mapped to the 1st symbol is the same as the complex-valued symbol mapped to the 2nd symbol.

In this embodiment, repetition processing is performed during resource mapping, that is, the complex-valued symbol mapped to the 1st symbol is the same as the complex-valued symbol mapped to the 2nd symbol. In this way, the 1st symbol for the receive-end terminal device may be used for AGC adjustment, and the 2nd symbol and subsequent symbols may be used for data demodulation, thereby increasing a demodulation success rate and improving communication efficiency.

Sub-embodiment 3: The terminal device has a PSSCH that needs to be transmitted, and performs rate matching and resource mapping according to the following steps.

1. If the number of symbols of the PSCCH is 2, refer to FIG. 2. The number of REs of the PSSCH that overlaps the PSCCH in time domain is M. The transmit-end terminal device calculates the length E of the coded bits carriable by the usable resource that excludes the REs of the PSSCH overlapping the PSCCH in time domain, that is, a length E of coded bits carriable by REs of part B in FIG. 2:

$$E = N_{RE} \cdot Q_m \cdot v,$$

where $N_{RE}$ is the number of usable REs in the scheduled resource that excludes the REs of the PSSCH overlapping the PSCCH in time domain, $Q_m$ is a modulation order, and $v$ is the number of layers.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E as the sequence length after rate matching.

5. Perform rate matching according to the PUSCH/PDSCH rate matching process, and output a sequence of the length E.

6. Perform possible scrambling on the sequence and perform modulation to generate complex-valued symbols, where the generated complex-valued symbols are mapped from the (M+1)-th RE to the last RE on the last symbol in ascending order according to a frequency-first principle and according to a frequency-first and time-second principle. A complex-valued symbol mapped on the first M REs is the same as the complex-valued symbol mapped on the (M+1)-th to (2M)-th REs.

Embodiment 2

(Embodiment 2 is divided into four sub-embodiments for description.)

Sub-Embodiment 1

The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot \upsilon,$$

where $N_{RE}$ is the number of usable REs in the scheduled resource with the 1-symbol AGC excluded, $Q_m$ is a modulation order, and $\upsilon$ is the number of layers.

A length E' of coded bits carriable by the 1-symbol AGC is calculated according to the following formula:

$$E' = N_{RE\_A} \cdot Q_m \cdot \upsilon,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E+E' as the sequence length after rate matching.

5. If shortening is used for bit selection, then
a sequence starting from k=A−E to A is mapped to bit positions of an output sequence from 0 to E−1; and
a sequence with a length E' starting from k=A−E is mapped to bit positions of an output sequence from E to E+E'−1, where a sequence with a length E+E' is generated after rate matching.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and remaining information is then mapped to the 1st symbol.

Sub-embodiment 2: The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot \upsilon,$$

where $N_{RE}$ is the number of usable REs in the scheduled resource with the 1-symbol AGC excluded, $Q_m$ is a modulation order, and $\upsilon$ is the number of layers.

A length E' of coded bits carriable by the 1-symbol AGC is calculated according to the following formula:

$$E' = N_{RE\_A} \cdot Q_m \cdot \upsilon,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E+E' as the sequence length after rate matching.

5. If puncturing is used for bit selection, then a sequence starting from k=0 to E−1 is mapped to bit positions of an output sequence from 0 to E−1; and
a sequence with a length E' starting from k=0 is mapped to bit positions of an output sequence from E to E+E'−1, where
a sequence with a length E+E' is generated after rate matching.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and a remaining sequence is mapped to the 1st symbol.

Sub-embodiment 3: The terminal device has a PSSCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot \upsilon,$$

where $N_{RE}$ is the number of usable REs in the scheduled resource with the 1-symbol AGC excluded, $Q_m$ is a modulation order, and $\upsilon$ is the number of layers.

A length E' of coded bits carriable by the 1-symbol AGC is calculated according to the following formula:

$$E' = N_{RE\_A} \cdot Q_m \cdot \upsilon,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E is mapped to bit positions of an output sequence from 0 to E−1. For example:

(a) if RV=0, a sequence starting from k=0 to E−1 is mapped to bit positions of an output sequence from 0 to E−1; and a sequence with a length E' starting from k=0 is mapped to bit positions of an output sequence from E to E+E'−1;

(b) if RV=1, a sequence starting from k=A/4 to A/4+E−1 is mapped to bit positions of an output sequence from 0 to E−1; and a sequence with a length E' starting from k=A/4 is mapped to bit positions of an output sequence from E to E+E'−1;

(c) if RV=2, a sequence starting from k=A/2 to A/2+E−1 is mapped to bit positions of an output sequence from 0 to E−1; and a sequence with a length E' starting from k=A/2 is mapped to bit positions of an output sequence from E to E+E'−1; and (d) if RV=3, a sequence starting from k=3A/4 to 3A/4+E−1 is mapped to bit positions of an output sequence from 0 to E−1; and a sequence with a length E' starting from k=3A/4 is mapped to bit positions of an output sequence from E to E+E'−1.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and a remaining sequence is mapped to the 1st symbol.

Sub-embodiment 4: The terminal device has a PSSCH that needs to be transmitted, and performs rate matching and resource mapping according to the following steps.

1. If the number of symbols of the PSCCH is 2, the number of REs of the PSSCH (refer to the PSCCH in part A of FIG. 2) that overlaps the PSCCH in time domain is M. The transmit-end terminal device calculates the length E of the coded bits carriable by the usable resource that excludes the REs of the PSSCH overlapping the PSCCH in time domain, that is, a length E of coded bits carriable by REs of part B in FIG. 2:

$$E = N_{RE} \cdot Q_m \cdot \upsilon,$$

where $N_{RE}$ is the number of usable REs in the scheduled resource that excludes the REs of the PSSCH overlapping the PSCCH in time domain, $Q_m$ is a modulation order, and $\upsilon$ is the number of layers.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E is mapped to bit positions of an output sequence from 0 to E−1. For example:

(a) if RV=0, a sequence starting from k=0 to E−1 is mapped to bit positions of an output sequence from 0 to E−1; and a sequence with a length E' starting from k=0 is mapped to bit positions of an output sequence from E to E+E'−1;

(b) if RV=1, a sequence starting from k=A/4 to A/4+E−1 is mapped to bit positions of an output sequence from 0 to E−1; and a sequence with a length E' starting from k=A/4 is mapped to bit positions of an output sequence from E to E+E'−1;

(c) if RV=2, a sequence starting from k=A/2 to A/2+E−1 is mapped to bit positions of an output sequence from 0 to E−1; and a sequence with a length E' starting from k=A/2 is mapped to bit positions of an output sequence from E to E+E'−1; and (d) if RV=3, a sequence starting from k=3A/4 to 3A/4+E−1 is mapped to bit positions of an output sequence from 0 to E−1; and a sequence with a length E' starting from k=3A/4 is mapped to bit positions of an output sequence from E to E+E'−1.

6. Perform possible scrambling on the sequence and perform modulation to generate complex-valued symbols, where the generated complex-valued symbols are mapped from the (M+1)-th RE to the last allocated RE in ascending order according to a time-first/frequency-first principle, and then remaining information is mapped to the first M REs according to a time-first/frequency-first principle. Information mapped to the first M REs is the same as information mapped to the (M+1)-th to (2M)-th REs.

In this embodiment, repetition processing is performed during resource mapping, that is, the information mapped to the 1st symbol is the same as the information mapped to the 2nd symbol. In this way, the 1st symbol for the receive-end terminal device may be used for AGC adjustment, and the 2nd symbol and subsequent symbols may be used for data demodulation, thereby increasing a demodulation success rate and improving communication efficiency.

Alternatively, in this embodiment, repetition processing is performed during resource mapping, and the information mapped to the first M REs is the same as the information mapped to the (M+1)-th to (2M)-th REs. In this way, when power boosting is performed for the PSCCH, repetition information with a smaller power spectral is on the PSSCH of the M REs that overlaps with the PSCCH in time domain. REs after the first M REs may be used for data demodulation, thereby increasing a demodulation success rate and improving communication efficiency.

Embodiment 3

(Embodiment 3 is divided into four sub-embodiments for description.)

Sub-Embodiment 1

The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $v$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input the sequence of length A into the circular buffer.

5. If shortening is used for bit selection, then a sequence starting from k=A−E to A is mapped to bit positions of an output sequence from E' to E+E'−1; and a sequence with a length E' starting from k=A−E is mapped to bit positions of an output sequence from 0 to E'−1, where a sequence with a length E+E' is generated after rate matching.

6. Perform possible scrambling on the sequence, and perform modulation to generate complex-valued symbols, where the generated complex-valued symbols are mapped from the 1st symbol to the last allocated symbol in ascending order according to a time-first/frequency-first principle.

Sub-embodiment 2: The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $v$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E+E' as the sequence length after rate matching.

5. If puncturing is used for bit selection, a sequence starting from k=0 to E−1 is mapped to bit positions of an output sequence from E' to E+E'−1; and a sequence with a length E' starting from k=0 is mapped to bit positions of an output sequence from 0 to E'−1, where a sequence with a length E+E' is generated after rate matching.

6. Perform possible scrambling on the sequence and perform modulation to generate complex-valued symbols, where the generated complex-valued symbols are mapped from the 1st symbol of the allocated resource to the last allocated symbol in ascending order according to a time-first/frequency-first principle.

Sub-embodiment 3: The terminal device has a PSSCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E is mapped to bit positions of an output sequence from E' to E+E'−1. For example:

(a) if RV=0, a sequence starting from k=0 to E−1 is mapped to bit positions of an output sequence from E' to E+E'−1; and a sequence with a length E' starting from k=0 is mapped to bit positions of an output sequence from 0 to E'−1;

(b) if RV=1, a sequence starting from k=A/4 to A/4+E−1 is mapped to bit positions of an output sequence from E' to E+E'−1; and a sequence with a length E' starting from k=A/4 is mapped to bit positions of an output sequence from 0 to E'−1;

(c) if RV=2, a sequence starting from k=A/2 to A/2+E−1 is mapped to bit positions of an output sequence from E' to E+E'−1; and a sequence with a length E' starting from k=A/2 is mapped to bit positions of an output sequence from 0 to E'−1; and (d) if RV=3, a sequence starting from k=3A/4 to 3A/4+E−1 is mapped to bit positions of an output sequence from E' to E+E'−1; and a sequence with a length E' starting from k=3A/4 is mapped to bit positions of an output sequence from 0 to E'−1.

6. Perform possible scrambling on the sequence and perform modulation to generate complex-valued symbols, where the generated complex-valued symbols are mapped from the 1st symbol to the last allocated symbol in ascending order according to a time-first/frequency-first principle.

Sub-embodiment 4: The terminal device has a PSSCH that needs to be transmitted, and performs rate matching and resource mapping according to the following steps.

1. If the number of symbols of the PSCCH is 2, the number of REs of the PSSCH (refer to the PSSCH in part A of FIG. 2) that overlaps the PSCCH in time domain is M. The transmit-end terminal device calculates the length E of the coded bits carriable by the usable resource that excludes the REs of the PSSCH overlapping the PSCCH in time domain, that is, a length E of coded bits carriable by REs of part B in FIG. 2:

$$E = N_{RE} \cdot Q_m \cdot v,$$

where $N_{RE}$ is the number of usable REs in the scheduled resource that excludes the REs of the PSSCH overlapping the PSCCH in time domain, $Q_m$ is a modulation order, and $\upsilon$ is the number of layers.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E is mapped to bit positions of an output sequence from E' to E+E'−1. For example:

(a) if RV=0, a sequence starting from k=0 to E−1 is mapped to bit positions of an output sequence from E' to E+E'−1; and a sequence with a length E' starting from k=0 is mapped to bit positions of an output sequence from 0 to E'−1;

(b) if RV=1, a sequence starting from k=A/4 to A/4+E−1 is mapped to bit positions of an output sequence from E' to E+E'−1; and a sequence with a length E' starting from k=A/4 is mapped to bit positions of an output sequence from 0 to E'−1;

(c) if RV=2, a sequence starting from k=A/2 to A/2+E−1 is mapped to bit positions of an output sequence from E' to E+E'−1; and a sequence with a length E' starting from k=A/2 is mapped to bit positions of an output sequence from 0 to E'−1; and (d) if RV=3, a sequence starting from k=3A/4 to 3A/4+E−1 is mapped to bit positions of an output sequence from E' to E+E'−1; and a sequence with a length E' starting from k=3A/4 is mapped to bit positions of an output sequence from 0 to E'−1.

6. Perform possible scrambling on the sequence and perform modulation to generate complex-valued symbols, where the generated complex-valued symbols are mapped from the 1st symbol to the last allocated symbol in ascending order according to a time-first/frequency-first principle.

In this embodiment, repetition processing is performed during resource mapping, that is, the complex-valued symbol mapped to the 1st symbol is the same as the complex-valued symbol mapped to the 2nd symbol. In this way, the 1st symbol for the receive-end terminal device may be used for AGC adjustment, and the 2nd symbol and subsequent symbols may be used for data demodulation, thereby increasing a demodulation success rate and improving communication efficiency.

Alternatively, in this embodiment, repetition processing is performed during resource mapping, and the information mapped to the first M REs is the same as the information mapped to the (M+1)-th to (2M)-th REs. In this way, when power boosting (power boosting) is performed for the PSCCH, repetition information with a smaller power spectral is on the PSSCH of the M REs that overlaps with the PSCCH in time domain. REs after the first M REs may be used for data demodulation, thereby increasing a demodulation success rate and improving communication efficiency.

Embodiment 4

The terminal device has a PSCCH that needs to be transmitted, and performs rate matching and resource mapping according to the following steps.

1. Determine the number of symbols of the AGC based on a relationship between the numerology and symbols of the AGC.

Specifically, for example, in a case of 15 kHz, the AGC has 0.5 symbols; otherwise, the AGC has 1 symbol. In this embodiment, assuming that the numerology is 15 kHz, the AGC has 0.5 symbols.

2. The transmit-end terminal device calculates, according to the following formula, the length E of the coded bits carriable by the usable resource with the 0.5-symbol AGC excluded:

$$E = N_{RE} \cdot Q_m \cdot v,$$

where $N_{RE}$ is the number of usable REs in the scheduled resource with the 0.5-symbol AGC excluded, $Q_m$ is a modulation order, and $\upsilon$ is the number of layers.

In this embodiment, the output sequence length after rate matching is E.

3. Perform CRC attachment, code block segmentation, and polar encoding on the input PSCCH, where a polar encoder output code length A is calculated based on the value of E during polar encoding, and A herein is the length of the circular buffer.

4. After polar encoding, perform sub-block interleaving, where the sequence length after interleaving is A.

5. Input the sequence of length A into the circular buffer.

6. Perform bit selection based on the rate matching process of DCI.

7. Perform possible scrambling and perform modulation to generate complex-valued symbols, where if the numerology is 15 kHz, the generated complex-valued symbols are mapped from the 1st symbol of the usable resource to the last allocated symbol in ascending order according to a time-first/frequency-first principle; and on the 1st symbol, every other RE in frequency domain is one usable REsource, and the AGC occupies the first half symbol of the usable resource.

Embodiment 5

The terminal device has a PSSCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $\upsilon$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E is mapped to bit positions of an output sequence from 0 to E−1, and a sequence of a length E' is mapped to bit positions of an output sequence from E' to E+E'−1, to obtain a sequence of a length E+E'. Possible scrambling is performed on the sequence of the length E+E' and modulation is performed to generate complex-valued symbols. Based on the RV version, mapping may be performed from the 2nd symbol or from the 1st symbol.

(a) If RV=0, the generated complex-valued symbols are mapped from the 2nd symbol to the last allocated symbol in ascending order according to a time-first/frequency-first principle, and a remaining sequence is mapped to the 1st symbol.

(b) If RV=1, the generated complex-valued symbols are mapped from the 2nd symbol to the last allocated symbol in ascending order according to a time-first/frequency-first principle, and a remaining sequence is mapped to the 1st symbol.

(c) If RV=2, the generated complex-valued symbols are mapped from the 1st symbol to the last allocated symbol in ascending order according to a time-first/frequency-first principle.

(d) If RV=3, the generated complex-valued symbols are mapped from the 1st symbol to the last allocated symbol in ascending order according to a time-first/frequency-first principle.

Embodiment 6

(Embodiment 6 is divided into four sub-embodiments for description.)

Sub-Embodiment 1

The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $\upsilon$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $\upsilon$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E+E' as the sequence length after rate matching.

5. If shortening is used for bit selection, then a sequence starting from k=A−E to A is mapped to bit positions of an output sequence from 0 to E−1; and a sequence with a length E' starting from k=0 is mapped to bit positions of an output sequence from E to E+E'−1, where a sequence with a length E+E' is generated after rate matching.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and a remaining sequence is mapped back to the 1st symbol.

Sub-Embodiment 2

The terminal device has a PSCCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE}$ is the number of usable REs in the 1-symbol AGC, $Q_m$ is a modulation order, and $v$ is the number of layers.

In this embodiment, the output sequence length after rate matching is E+E'.

2. Perform CRC attachment, code block segmentation, and polar encoding on the input PSCCH, where a polar encoder output code length A is calculated based on the value of E during polar encoding, and A herein is the length of the circular buffer.

3. After polar encoding, perform sub-block interleaving, where the sequence length after interleaving is A.

4. Input a sequence of the length A to the circular buffer, and define E+E' as the sequence length after rate matching.

5. If puncturing is used for bit selection, a sequence starting from k=0 to E−1 is mapped to bit positions of an output sequence from 0 to E−1; and a sequence with a length E' starting from k=E is mapped to bit positions of an output sequence from E to E+E'−1, where a sequence with a length E+E' is generated after rate matching.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and a remaining sequence is mapped back to the 1st symbol.

Sub-Embodiment 3

The terminal device has a PSSCH that needs to be transmitted, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $v$ is the number of layers.

In this embodiment, the output sequence length after rate matching is E+E'.

2. Perform CRC attachment, code block segmentation, and LDPC encoding on the input PSSCH.

3. After LDPC encoding, output a sequence of a length A, where

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E+E' is mapped to bit positions of an output sequence from 0 to E+E'−1. For example:

(a) if RV=0, a sequence starting from k=0 to E+E'−1 is mapped to bit positions of an output sequence from 0 to E+E'−1;

(b) if RV=1, a sequence starting from k=A/4 to A/4+E+E'−1 is mapped to bit positions of an output sequence from 0 to E+E'−1;

(c) if RV=2, a sequence starting from k=A/2 to A/2+E+E'−1 is mapped to bit positions of an output sequence from 0 to E+E'−1; and (d) if RV=3, a sequence starting from k=3A/4 to 3A/4+E+E'−1 is mapped to bit positions of an output sequence from 0 to E+E'−1.

6. Perform possible scrambling on the sequence and perform modulation to generate complex-valued symbols, where the generated complex-valued symbols are mapped from the 2nd symbol to the last allocated symbol in ascending order according to a time-first/frequency-first principle, and remaining information is then mapped back to the 1st symbol.

Sub-Embodiment 4

The terminal device has a PSSCH that needs to be transmitted, and performs rate matching and resource mapping according to the following steps.

1. If the number of symbols of the PSCCH is 2, the number of REs of the PSSCH (refer to the PSSCH in part A of FIG. 2) that overlaps the PSCCH in time domain is M. The transmit-end terminal device calculates the length E of the coded bits carriable by the usable resource that excludes the REs of the PSSCH overlapping the PSCCH in time domain, that is, a length E of coded bits carriable by REs of part B in FIG. 2:

$$E = N_{RE} \cdot Q_m \cdot v,$$

where $N_{RE}$ is the number of usable REs in the scheduled resource that excludes the REs of the PSSCH overlapping the PSCCH in time domain, $Q_m$ is a modulation order, and $v$ is the number of layers.

2. Perform CRC attachment, code block segmentation, and LDPC encoding on the input PSSCH.

3. After LDPC encoding, output a sequence of a length A, where A herein is the length of the circular buffer.

4. Input a sequence of the length A to the circular buffer, and define E+E' as the sequence length after rate matching.

5. Perform rate matching according to the PUSCH/PDSCH rate matching process, where starting from a starting position of a currently transmitted RV, a sequence of a length E+E' is mapped to bit positions of an output sequence from 0 to E+E'−1. For example:

(a) if RV=0, a sequence starting from k=0 to E+E'−1 is mapped to bit positions of an output sequence from 0 to E+E'−1;

(b) if RV=1, a sequence starting from k=A/4 to A/4+E+E'−1 is mapped to bit positions of an output sequence from 0 to E+E'−1;

(c) if RV=2, a sequence starting from k=A/2 to A/2+E+E'−1 is mapped to bit positions of an output sequence from 0 to E+E'−1; and (d) if RV=3, a sequence starting from k=3A/4 to 3A/4+E+E'−1 is mapped to bit positions of an output sequence from 0 to E+E'−1.

6. Perform possible scrambling on the sequence and perform modulation to generate complex-valued symbols, where the generated complex-valued symbols are mapped from the (M+1)-th RE to the last RE on the last allocated symbol in ascending order according to a time-first/frequency-first principle, and remaining information is then mapped to the first M REs according to a time-first/frequency-first principle.

Embodiment 7

The terminal device has a PSSCH that needs to be transmitted, and the terminal device has configured slot aggregation for transmitting a large transport block, and performs rate matching and resource mapping according to the following steps.

1. In a case of 1-symbol AGC, the transmit-end terminal device calculates, according to the following formula, the length E of the coded bits carriable by the usable resource with the 1-symbol AGC excluded:

$$E = N_{RE} \cdot Q_m \cdot v,$$

where $N_{RE}$ is the number of usable REs in the scheduled resource with the 1-symbol AGC excluded, $Q_m$ is a modulation order, and $v$ is the number of layers.

A length E' of coded bits carriable by the 1-symbol AGC is calculated according to the following formula:

$$E' = N_{RE\_A} \cdot Q_m \cdot v,$$

where $N_{RE\_A}$ is the number of usable REs in the 1-symbol AGC, $Q_m$ is a modulation order, and $v$ is the number of layers.

In this embodiment, the output sequence length after rate matching is E+E'.

2. For subsequent steps of this embodiment, refer to the sub-embodiment 3 of Embodiment 2.

In this embodiment, slot aggregation is configured, and generally, there is an AGC symbol at a starting position of each slot, the same as the processing manner of the previous embodiment.

Alternatively, if slot aggregation is considered to be one scheduling, there is an AGC symbol only at a starting position of slot aggregation.

The foregoing describes in detail the method for sidelink rate matching and resource mapping provided in the embodiments of this disclosure with reference to FIG. 1 to FIG. 2. The following describes in detail a terminal device according to an embodiment of this application with reference to FIG. 3.

Figure 3:
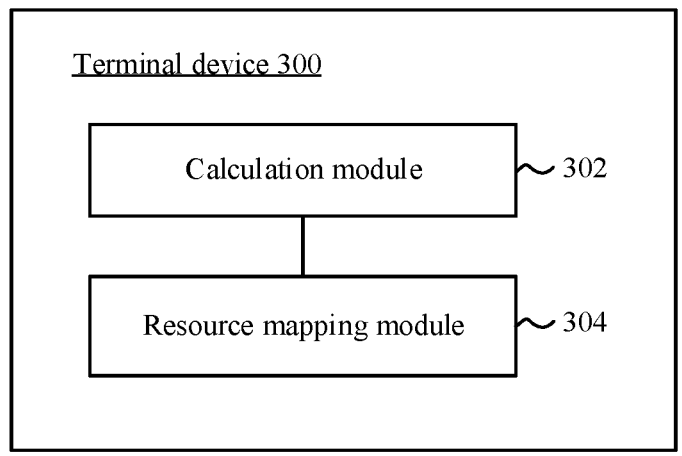
FIG. 3 is a schematic structural diagram of a terminal device according to an embodiment of this disclosure.

FIG. 3 is a schematic structural diagram of a terminal device according to an embodiment of this disclosure. As shown in FIG. 3, the terminal device 300 includes:

a calculation module 302, configured to: based on a resource size of a target resource, calculate a length E of coded bits carriable by a usable resource with the target resource excluded; and a resource mapping module 304, configured to perform resource mapping based on a coded bit sequence output by rate matching, where a length of the coded bit sequence is equal to E or equal to E+E', and E' is a length of coded bits carriable by the target resource.

In this embodiments of this disclosure, the terminal device may calculate, based on the resource size of the target resource, the length E of the coded bits carriable by the usable resource with the target resource excluded; and perform resource mapping based on the coded bit sequence output by rate matching, where the length of the coded bit sequence is equal to E or equal to E+E', and E' is the length of the coded bits carriable by the target resource. In this embodiment of this disclosure, the length E of the coded bits carriable by the usable resource with the target resource excluded is calculated, so as to provide a solution to rate matching and resource mapping for NR sidelink. In addition, the target resource in the usable resource is considered during the rate matching and resource mapping, thereby increasing a demodulation success rate of sidelink data and improving transmission efficiency of a system.

Optionally, in an embodiment, the target resource includes:

a resource occupied by AGC, or a resource occupied by a PSSCH, where the resource occupied by the PSSCH and a resource occupied by a physical sidelink control channel PSCCH overlap in time domain.

Optionally, as an embodiment, the resource mapping module 304 may be specifically configured to:

map the coded bit sequence output by rate matching to the usable resource from the (N+1)-th symbol to the last symbol of the usable resource in ascending order, and then mapping a remaining coded bit sequence to the usable resource from the 1st symbol to the N-th symbol in ascending order.

The length of the coded bit sequence output by rate matching is equal to E+E', N is related to a transport block size, and the transport block size is related to the usable resource.

Optionally, as an embodiment, the resource mapping module 304 may be specifically configured to:

map the coded bit sequence output by rate matching to the usable resource from the (M+1)-th resource element RE to the last RE of the usable resource in ascending order, and then mapping a remaining coded bit sequence to the usable resource from the 1st RE to the M-th RE in ascending order.

The length of the coded bit sequence output by rate matching is equal to E+E', the target resource includes a resource occupied by the PSSCH, and M is the number of REs occupied by the PSSCH.

Optionally, as an embodiment, the resource mapping module 304 may be specifically configured to:

map the coded bit sequence output by rate matching to the usable resource from the (N+1)-th symbol to the last symbol of the usable resource in ascending order, where in the usable resource, complex-value symbols mapped to the first N symbols are the same as complex-value symbols mapped to the (N+1)-th to (2N)-th symbols.

The length of the coded bit sequence output by rate matching is equal to E, N is related to a transport block size, and the transport block size is related to the usable resource.

Optionally, as an embodiment, the resource mapping module 304 may be specifically configured to:

map the coded bit sequence output by rate matching to the usable resource from the (M+1)-th RE to the last RE of the usable resource in ascending order, where in the usable resource, complex-value symbols mapped to the first M REs are the same as complex-value symbols mapped to the (M+1)-th to (2M)-th REs.

The length of the coded bit sequence output by rate matching is equal to E, the target resource includes a resource occupied by the PSSCH, and M is the number of REs occupied by the PSSCH.

Optionally, as an embodiment, the resource mapping module 304 may be specifically configured to:

map the coded bit sequence output by rate matching to the usable resource from the 1st symbol to the last symbol of the usable resource in ascending order.

The length of the coded bit sequence output by rate matching is equal to E+E', N is related to a transport block size, and the transport block size is related to the usable resource.

Optionally, as an embodiment, the resource mapping module 304 may be specifically configured to:

map the coded bit sequence output by rate matching to the usable resource from the 1st symbol to the last symbol of the usable resource in ascending order.

The number of usable resource elements REs on the 1st symbol is half the total number of REs on the 1st symbol, and the length of the coded bit sequence output by rate matching is equal to E.

Optionally, in an embodiment, in the usable resource, mapping information of the first N symbols is repetition of mapping information of the (N+1)-th to (2N)-th symbols; or in the usable resource, mapping information of the first M REs is repetition of mapping information of the (M+1)-th to (2M)-th REs.

Optionally, in an embodiment, the terminal device 300 further includes a rate matching module, configured to:

in a case of polar coding, output a subsequence with a second sequence length E' and a subsequence with a first sequence length E starting from a position of $k=0$ of coded bits, so as to generate a sequence with a length E'+E, where the subsequence with the length E' is after the subsequence of the length E; or in a case of polar coding, output a subsequence with a second sequence length E' and a subsequence with a first sequence length E starting from a position of $k=A-E$ of coded bits, so as to generate a sequence with a length E'+E, where the subsequence with the length E' is after the subsequence of the length E; where A is a length of the circular buffer, A is obtained through calculation based on E, and k represents a starting output position of the coded bits.

Optionally, in an embodiment, the terminal device 300 further includes a rate matching module, configured to:

in a case of LDPC coding, output a subsequence with a second sequence length E' and a subsequence with a first sequence length E starting from a starting information position of a redundancy version, so as to generate a sequence with a length E'+E, where the subsequence with the length E' is after the subsequence of the length E.

Optionally, in an embodiment, the terminal device 300 further includes a rate matching module, configured to:

in a case of polar coding, output a subsequence with a first sequence length E starting from a position of $k=A-E$ of coded bits, and outputting a subsequence with a second sequence length E' starting from a position of $k=0$ of the coded bits, so as to generate a sequence with a length E'+E, where the subsequence with the length E is after the subsequence of the length E'; or in a case of polar coding, output a subsequence with a first sequence length E starting from a position of $k=0$ of coded bits, and outputting a subsequence with a second sequence length E' starting from a position of $k=E$ of the coded bits, so as to generate a sequence with a length E'+E, where the subsequence with the length E' is after the subsequence of the length E; or in a case of polar coding, output a subsequence with a first sequence length E starting from a position of $k=E \bmod A$ of coded bits, and outputting a subsequence with a second sequence length E' starting from a position of $k=(E \bmod A)+E$ of the coded bits, so as to generate a sequence with a length E'+E, where the subsequence with the length E' is after the subsequence of the length E; where A is a length of the circular buffer, A is obtained through calculation based on E, k represents a starting output position of the coded bits, and mod represents a modulo operation.

Optionally, in an embodiment, the terminal device 300 further includes a rate matching module, configured to:

in a case of LDPC coding, output a subsequence with a second sequence length E and a subsequence with a first sequence length E starting from a position of m=E of a redundancy version, so as to generate a sequence with a length E'+E, where the subsequence with the length E' is after the subsequence of the length E; or in a case of LDPC coding, output a subsequence with a second sequence length E' and a subsequence with a first sequence length E starting from a position of m=E mod A of a redundancy version, so as to generate a sequence with a length E'+E, where the subsequence with the length E' is after the subsequence of the length E; where A is a length of the circular buffer, A is obtained through calculation based on E, m represents a starting output position, and mod represents a modulo operation.

Optionally, in an embodiment, the terminal device 300 further includes a rate matching module, configured to:

in a case of polar coding, output a subsequence with a second sequence length E' and a subsequence with a first sequence length E starting from a position of k=0 of coded bits, so as to generate a sequence with a length E'+E, where the subsequence with the length E' is before the subsequence of the length E; or in a case of polar coding, output a subsequence with a second sequence length E' and a subsequence with a first sequence length E starting from a position of k=A−E of coded bits, so as to generate a sequence with a length E'+E, where the subsequence with the length E' is before the subsequence of the length E; where A is a length of the circular buffer, A is obtained through calculation based on E, and k represents a starting output position of the coded bits.

Optionally, in an embodiment, the terminal device 300 further includes a rate matching module, configured to:

in a case of LDPC coding, output a subsequence with a second sequence length E' and a subsequence with a first sequence length E starting from a starting information position of a redundancy version, so as to generate a sequence with a length E'+E, where the subsequence with the length E' is before the subsequence of the length E.

Optionally, in an embodiment, the terminal device 300 further includes a selection module, configured to:

based on a configuration of numerology, determine a starting symbol position or starting RE position for the resource mapping.

Optionally, in an embodiment, the terminal device 300 further includes a selection module, configured to:

determine, based on a redundancy version, a starting symbol position or starting RE position for the resource mapping.

Optionally, in an embodiment, the selection module may be specifically configured to:

determine, based on a redundancy version and whether LBRM is enabled, a starting symbol position or starting RE position for the resource mapping.

For the terminal device 300 in this embodiment of this disclosure, refer to the processes of the method 100 in the corresponding embodiment of this disclosure, and the units/modules of the terminal device 300 and other operations and/or functions described above are used to implement the corresponding processes in the method 100, with the same or equivalent technical effects achieved. For brevity, details are not repeated herein.

Figure 4:
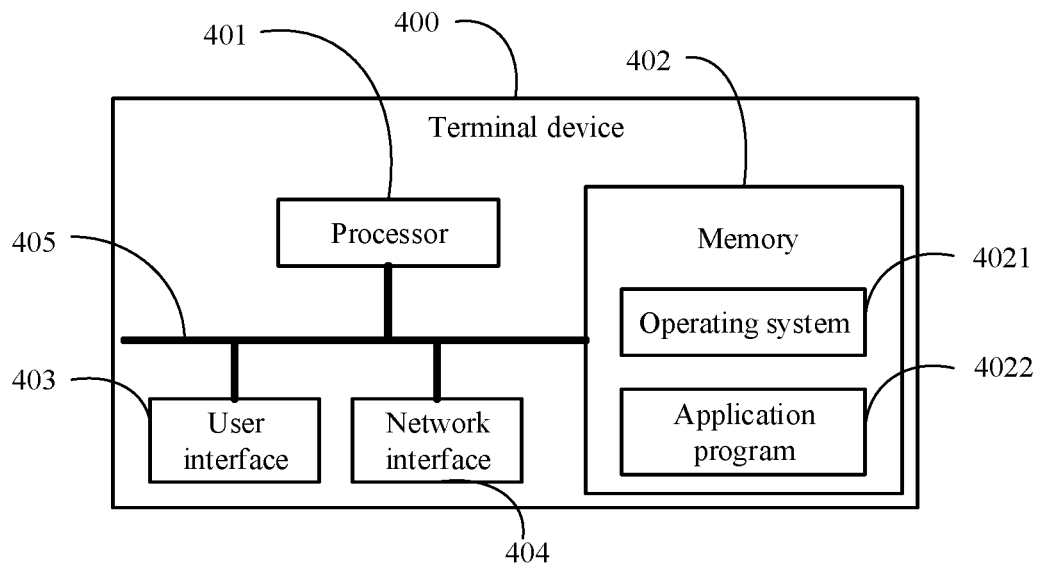
FIG. 4 is a schematic structural diagram of a terminal device according to another embodiment of this disclosure.

FIG. 4 is a block diagram of a terminal device according to another embodiment of this disclosure. The terminal device 400 shown in FIG. 4 includes at least one processor 401, a memory 402, at least one network interface 404, and a user interface 403. The components of the terminal device 400 are coupled together by using a bus system 405. It can be understood that the bus system 405 is configured to implement connection communication between these components. The bus system 405 may include not only a data bus but also a power supply bus, a control bus, and a status signal bus. However, for clear description, various buses in FIG. 4 are marked as the bus system 405.

The user interface 403 may include a display, a keyboard, a click device (for example, a mouse or a trackball), a touch board, or a touchscreen.

It can be understood that the memory 402 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and serves as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 402 in the system and method described in the embodiments of this disclosure is intended to include but is not limited to these and any other suitable types of memories.

In some implementations, the memory 402 stores the following elements: an executable module or a data structure, or a subset thereof, or an extended set thereof: an operating system 4021 and an application program 4022.

The operating system 4021 includes various system programs, such as a framework layer, a kernel library layer, and a driver layer, and is configured to implement various basic services and process hardware-based tasks. The application program 4022 includes various application programs, such as a media player, and a browser, and is configured to implement various application services. A program that implements the methods of the embodiments of this disclosure may be included in the application program 4022.

In this embodiment of this disclosure, the terminal device 400 further includes a computer program stored in the memory 402 and capable of running on the processor 401. When being executed by the processor 401, the computer program implements the following steps of the method 100.

The method disclosed in the embodiments of this disclosure can be applied to the processor 401, or is implemented by the processor 401. The processor 401 may be an integrated circuit chip with a signal processing capability. In an implementation process, the steps in the foregoing method may be implemented by using a hardware integrated logic circuit in the processor 401, or by using instructions in a form of software. The foregoing processor 401 may be a general processor, a digital signal processor (DSP), an application-specific integrated circuit (ASIC), a field programmable gate array (FPGA) or another programmable logic device, a discrete gate or transistor logic device, or a discrete hardware component. The processor 401 may implement or execute the methods, steps, and logical block diagrams disclosed in the embodiments of this disclosure. The general-purpose processor may be a microprocessor or any regular processor. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 402, and the processor 401 reads information in the memory 402 and implements, in combination with its hardware, the steps of the foregoing methods. Specifically, a computer program is stored in the computer-readable storage medium, and when the computer program is executed by the processor 401, the steps of the embodiments of the foregoing method 100 implemented.

It can be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

The terminal device 400 is capable of implementing the processes that are implemented by the terminal device in the foregoing embodiments, with the same or equivalent technical effects achieved. To avoid repetition, details are not described herein again.

An embodiment of this disclosure further provides a computer-readable storage medium, where a computer program is stored in the computer readable storage medium. When the computer program is executed by a processor, the processes of the foregoing embodiment of the method 100 are implemented, with the same technical effects achieved. To avoid repetition, details are not described herein again. The computer-readable storage medium is, for example, a non-transitory computer-readable storage medium, such as a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware or software. However, in most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for sidelink rate matching and resource mapping, wherein the method is executed by a terminal device, and the method comprises:
    calculating, based on a resource size of a target resource, a length E of coded bits carriable by a usable resource with the target resource excluded; and
    performing resource mapping based on a coded bit sequence output by rate matching, wherein a length of the coded bit sequence is equal to E or equal to E+E', and E' is a length of coded bits carriable by the target resource;
    wherein the performing resource mapping based on a coded bit sequence output by rate matching comprises:
    mapping the coded bit sequence output by rate matching to the usable resource in ascending order from a (N+1)-th symbol to a last symbol of the usable resource, wherein in the usable resource, complex-value symbols mapped to a first N symbols are the same as complex-value symbols mapped to the (N+1)-th to (2N)-th symbols, wherein
    the length of the coded bit sequence output by rate matching is equal to E, N is related to a transport block size, and the transport block size is related to the usable resource.

2. The method according to claim 1, wherein the target resource comprises:
    a resource occupied by automatic gain control (AGC); or
    a resource occupied by a physical sidelink shared channel (PSSCH), wherein the resource occupied by the PSSCH and a resource occupied by a physical sidelink control channel PSCCH overlap in time domain.

3. The method according to claim 1, wherein before the performing resource mapping based on a coded bit sequence output by rate matching, the method further comprises:

based on a configuration of numerology, determining a starting symbol position or starting resource element (RE) position for the resource mapping.

4. The method according to claim 1, wherein before the performing resource mapping based on a coded bit sequence output by rate matching, the method further comprises:
determining, based on a redundancy version, a starting symbol position or starting resource element (RE) position for the resource mapping.

5. The method according to claim 4, wherein the determining, based on a redundancy version, a starting symbol position or starting RE position for the resource mapping comprises:
based on the redundancy version and whether limited buffer rate matching LBRM is enabled, determining the starting symbol position or starting RE position for the resource mapping.

6. A terminal device, comprising a memory, a processor, and a computer program stored in the memory and capable of running on the processor, wherein the computer program is executed by the processor to implement:
calculating, based on a resource size of a target resource, a length E of coded bits carriable by a usable resource with the target resource excluded; and
performing resource mapping based on a coded bit sequence output by rate matching, wherein a length of the coded bit sequence is equal to E or equal to E+E', and E' is a length of coded bits carriable by the target resource;
wherein the performing resource mapping based on a coded bit sequence output by rate matching comprises:
mapping the coded bit sequence output by rate matching to the usable resource in ascending order from a (N+1)-th symbol to a last symbol of the usable resource, wherein in the usable resource, complex-value symbols mapped to a first N symbols are the same as complex-value symbols mapped to the (N+1)-th to (2N)-th symbols, wherein
the length of the coded bit sequence output by rate matching is equal to E, N is related to a transport block size, and the transport block size is related to the usable resource.

7. The terminal device according to claim 6, wherein the target resource comprises:
a resource occupied by automatic gain control (AGC); or
a resource occupied by a physical sidelink shared channel (PSSCH), wherein the resource occupied by the PSSCH and a resource occupied by a physical sidelink control channel PSCCH overlap in time domain.

8. The terminal device according to claim 6, wherein before the performing resource mapping based on a coded bit sequence output by rate matching, the method further comprises: based on a configuration of numerology, determining a starting symbol position or starting resource element (RE) position for the resource mapping.

9. The terminal device according to claim 6, wherein before the performing resource mapping based on a coded bit sequence output by rate matching, the method further comprises: determining, based on a redundancy version, a starting symbol position or starting resource element (RE) position for the resource mapping.

10. The terminal device according to claim 9, wherein the determining, based on a redundancy version, a starting symbol position or starting RE position for the resource mapping comprises:
based on the redundancy version and whether limited buffer rate matching LBRM is enabled, determining the starting symbol position or starting RE position for the resource mapping.

11. A non-transitory computer-readable storage medium, wherein the non-transitory computer-readable storage medium stores a computer program, and the computer program is executed by a processor to implement:
calculating, based on a resource size of a target resource, a length E of coded bits carriable by a usable resource with the target resource excluded; and
performing resource mapping based on a coded bit sequence output by rate matching, wherein a length of the coded bit sequence is equal to E or equal to E+E', and E' is a length of coded bits carriable by the target resource;
wherein the performing resource mapping based on a coded bit sequence output by rate matching comprises:
mapping the coded bit sequence output by rate matching to the usable resource in ascending order from a (N+1)-th symbol to a last symbol of the usable resource, wherein in the usable resource, complex-value symbols mapped to a first N symbols are the same as complex-value symbols mapped to the (N+1)-th to (2N)-th symbols, wherein
the length of the coded bit sequence output by rate matching is equal to E, N is related to a transport block size, and the transport block size is related to the usable resource.

12. The non-transitory computer-readable storage medium according to claim 11, wherein the target resource comprises:
a resource occupied by automatic gain control (AGC); or
a resource occupied by a physical sidelink shared channel (PSSCH), wherein the resource occupied by the PSSCH and a resource occupied by a physical sidelink control channel PSCCH overlap in time domain.

13. The non-transitory computer-readable storage medium according to claim 11, wherein before the performing resource mapping based on a coded bit sequence output by rate matching, the method further comprises:
based on a configuration of numerology, determining a starting symbol position or starting resource element (RE) position for the resource mapping.

14. The non-transitory computer-readable storage medium according to claim 11, wherein before the performing resource mapping based on a coded bit sequence output by rate matching, the method further comprises:
determining, based on a redundancy version, a starting symbol position or starting resource element (RE) position for the resource mapping.

15. The non-transitory computer-readable storage medium according to claim 14, wherein the determining, based on a redundancy version, a starting symbol position or starting RE position for the resource mapping comprises:
based on the redundancy version and whether limited buffer rate matching LBRM is enabled, determining the starting symbol position or starting RE position for the resource mapping.

* * * * *